(12) United States Patent
Peterson et al.

(10) Patent No.: US 7,574,029 B2
(45) Date of Patent: Aug. 11, 2009

(54) CHARACTERISTIC PATH-BASED COLON SEGMENTATION

(75) Inventors: Samuel W. Peterson, St. Paul, MN (US); Marek Brejl, Eden Praire, MN (US); Annapoorani Gothandaraman, Iselin, NJ (US)

(73) Assignee: Vital Images, Inc., Minnetonka, MN (US)

( * ) Notice: Subject to any disclaimer, the term of this patent is extended or adjusted under 35 U.S.C. 154(b) by 694 days.

(21) Appl. No.: 11/287,497

(22) Filed: Nov. 23, 2005

(65) Prior Publication Data

US 2007/0116346 A1    May 24, 2007

(51) Int. Cl.
*G06K 9/00* (2006.01)
*G06K 9/34* (2006.01)

(52) U.S. Cl. .................. 382/130; 382/173
(58) Field of Classification Search .......... 382/128, 382/129, 130, 131, 132, 133, 134, 154, 164, 382/171, 173, 179; 600/407, 410, 411, 425, 600/433, 560, 456, 507; 128/916, 920; 434/262, 434/267
See application file for complete search history.

(56) References Cited

U.S. PATENT DOCUMENTS

| | | | | |
|---|---|---|---|---|
| 6,331,116 B1 * | 12/2001 | Kaufman et al. | ............ | 434/262 |
| 7,044,982 B2 * | 5/2006 | Milbocker | ............... | 623/23.72 |
| 7,224,827 B2 * | 5/2007 | Acar et al. | .................. | 382/131 |
| 7,457,444 B2 * | 11/2008 | Geiger et al. | ............... | 382/128 |

FOREIGN PATENT DOCUMENTS

| WO | WO-2007061934 A2 | 5/2007 |
|---|---|---|
| WO | WO-2007061934 A3 | 5/2007 |

OTHER PUBLICATIONS

"International Application Serial No. PCT/US2006/044842, International Search Report mailed Apr. 14, 2008", 7 pgs.
"International Application Serial No. PCT/US2006/044842, Written Opinion mailed Apr. 14, 2008", 12 pgs.
Frimmel, H., "Centerline-based colon segmentation for CT colonography", *Medical Physics*, 32(8), (Aug. 2005), 2665-2672.
Frimmel, Hans, et al., "Fast and robust computation of colon centerline in CT colonography", *Medical Physics, AIP*, 31(11), (Oct. 27, 2004), 3046-3056.
Lichan, H., et al., "Reconstruction And Visualization of 3D Models of Colonic Surface", *IEEE Transaction of Nuclear Science, IEEE Service Centre*, Newyork, NY, US vol. 44(3), (Jun. 1997), 1297-1302.

(Continued)

*Primary Examiner*—Abolfazl Tabatabai
(74) *Attorney, Agent, or Firm*—Schwegman, Lundberg & Woessner, P.A.

(57) ABSTRACT

This document discusses, among other things, systems and methods for efficiently calculating a colon segmentation from one or more candidate virtual three-dimensional objects. A sequence of image scans are analyzed and regions that represent air-filled objects and tagged-stool are identified as candidate segments. A characteristic path is generated for each candidate segment. The paths are joined using a cost network and re-oriented to be consistent with a typical flythrough path. The connected path is then used to generate a continuous volumetric virtual object.

39 Claims, 8 Drawing Sheets

OTHER PUBLICATIONS

Masutani, Y., et al., "Automated segmentation of colonic walls for computerized detection of polyps in CT colonography", *J Comput Assist Tomogr.*, 25(4), (Jul.-Aug. 2001), 629-38.

Medved, M., et al., "Segmentation and Segment connection of obstructed colon", *Proceedings of the Spie*, 5370(1), (Feb. 16, 2004), 467-474.

Nappi, J., et al., "A New High-performance CAD Scheme for the Detection of Polyps in CT Colongraphy", *Proc. SPIE*, 5370, (2004), 839-848.

Nappi, J., et al., "Automated knowledge-guided segmentation of colonic walls for computerized detection of polyps in CT colonography", *J Comput Assist Tomogr.*, 26(4), (Jul.-Aug. 2002), 493-504.

Nappi, J., et al., "Effect of Knowledge-Guided Colon Segmentation in Automatic Detection of Polyps in CT Colonography", *Proc. SPIE*, 4683, (2002), 222-229.

Paik, D. S, et al., "Automated Flight path planning for virtual endoscopy", *Medical Physics, AIP*, Melville, NY, US, vol. 25(5), (May 1998), 629-637.

Verroust, A., et al., "Extracting Skeletal curves from 3D scattered data", *Shape Modeling and Applications*, Proceedings Shape Modeling of International, (Mar. 1, 1999), 194-201.

\* cited by examiner

CHARACTERISTIC PATH-BASED COLON SEGMENTATION

TECHNICAL FIELD

This patent document pertains generally to volumetric imaging of biological or other objects, and more particularly, but not by way of limitation, to systems or methods to quickly construct a three-dimensional representation of a colon using volumetric imaging data.

BACKGROUND

In recent years, medical imaging has become a highly valuable tool for medical professionals. One common imaging technique is computed tomography (CT). The CT images, typically of one or more axial volumetric scans, are either analyzed individually by a radiologist or alternatively, they can be reconstructed into a three-dimensional (3D) model. Three-dimensional modeling has been used in a variety of clinical applications including virtual colonoscopies, virtual bronchoscopies, and virtual angioscopies. Using a computer-generated model from CT scans, a radiologist can pre-screen patients for cancer or other diseases. Using such a virtual model avoids subjecting the patient to a traditional manual endoscopy, which can be uncomfortable, expensive, and inaccurate.

There are several methods used to construct a volumetric representation of an object, such as when given a set of two-dimensional scans. The most common method is segmentation. Segmentation uses the image intensity of portions of a scan to determine what portions are "inside" the object to be defined, and what portions are "outside." The output of such a segmentation process is a volumetric virtual object, which is typically represented by a collection of voxels (3D pixels) arranged in 3D space.

In a typical scan, organs, bone, and other materials appear with varying intensities along with the region of interest. For example, in a colonic scan, the lower portions of the lungs, the stomach, and the small bowel typically appear. To reduce the processing complexity, it is desirable to isolate the region of interest (e.g., the colon) and remove the excess portions (e.g., extracolonic components) from the scan.

Some of the same heuristics used in the segmentation to determine the interior and exterior of a virtual object can be reused to determine relevant and irrelevant regions in a scan. Image intensity and other characteristics such as position and size can be used to help determine relevant regions.

However, determining all of the relevant regions is made more difficult in many cases where the colon is represented as several disconnected fragments. In one instance, this can occur when there is insufficient distention of the colon, which is caused typically by suboptimal inflation. Other causes include large polyps or lesions, which can disconnect adjoining segments of the colon.

SUMMARY

While manual identification of relevant regions in a scan is possible, it is desirable to achieve the identification and combination of disconnected fragments automatically. This document discusses, among other things, systems and methods for efficiently and automatically calculating a colon segmentation from one or more candidate virtual three-dimensional objects. A sequence of image scans are analyzed and regions that represent air-filled objects and tagged-stool are identified as candidate segments. A characteristic path is generated for each candidate segment. The paths are joined using a cost network and reoriented to be consistent with a typical flythrough path. The connected path is then used to generate a continuous volumetric virtual object.

Certain examples describe a computer-assisted method of using volumetric image data to construct a representation of a virtual colon. In such examples, the method includes determining a set of one or more candidate segments in the volumetric image data. Landmark segments are identified from the set of candidate segments. A characteristic path is generated for each candidate segment. A first combined path is created by connecting the characteristic paths with the use of a cost network. The first combined path is evaluated to determine if it is well-formed. If it is well-formed, then the first combined path is used to determine a set of one or more connecting segments between one or more successive pairings of characteristic paths along the first combined path. If the first combined path is not well-formed, then a descending colon segment is identified and the first combined path is recalculated with the descending colon segment included. The new re-calculated first combined path is used to determine a set of one or more connecting segments between one or more successive pairings of characteristic paths along the path. In either case, after the combined path is determined, a set of one or more path segments that correlate to a set of one or more characteristic paths that define the combined path is identified. A final characteristic path is computed using the set of path segments in union with the set of connecting segments.

Systems and computer-readable media for performing the methods are also described. This summary is intended to provide an overview of certain subject matter of the present patent application. It is not intended to provide an exclusive or exhaustive explanation of the invention. The detailed description is included to provide further information about the subject matter of the present patent application.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Introduction

The present inventors have recognized that frequently, because of insufficient inflation or other causes, a colon in a scan is often represented as several disconnected fragments. Among other things, this document describes an accurate way to automatically combine fragmented segments to form a continuous virtual 3D object using paths. Examples of a path include, without limitation, centerline paths or characteristic paths. A characteristic path may not provide complete centricity of the object and, therefore, does not necessarily constitute a centerline. Nevertheless, a characteristic path will typically be sufficiently representative of the object to permit full segmentation. Examples of a fragmented object include a colon and a small bowel. In this detailed description, the process of automatically reconstructing a colon segmentation is described. However, a similar process could be used for reconstructing segmentations representing a small bowel or other generally tubular organs.

Figure 1:
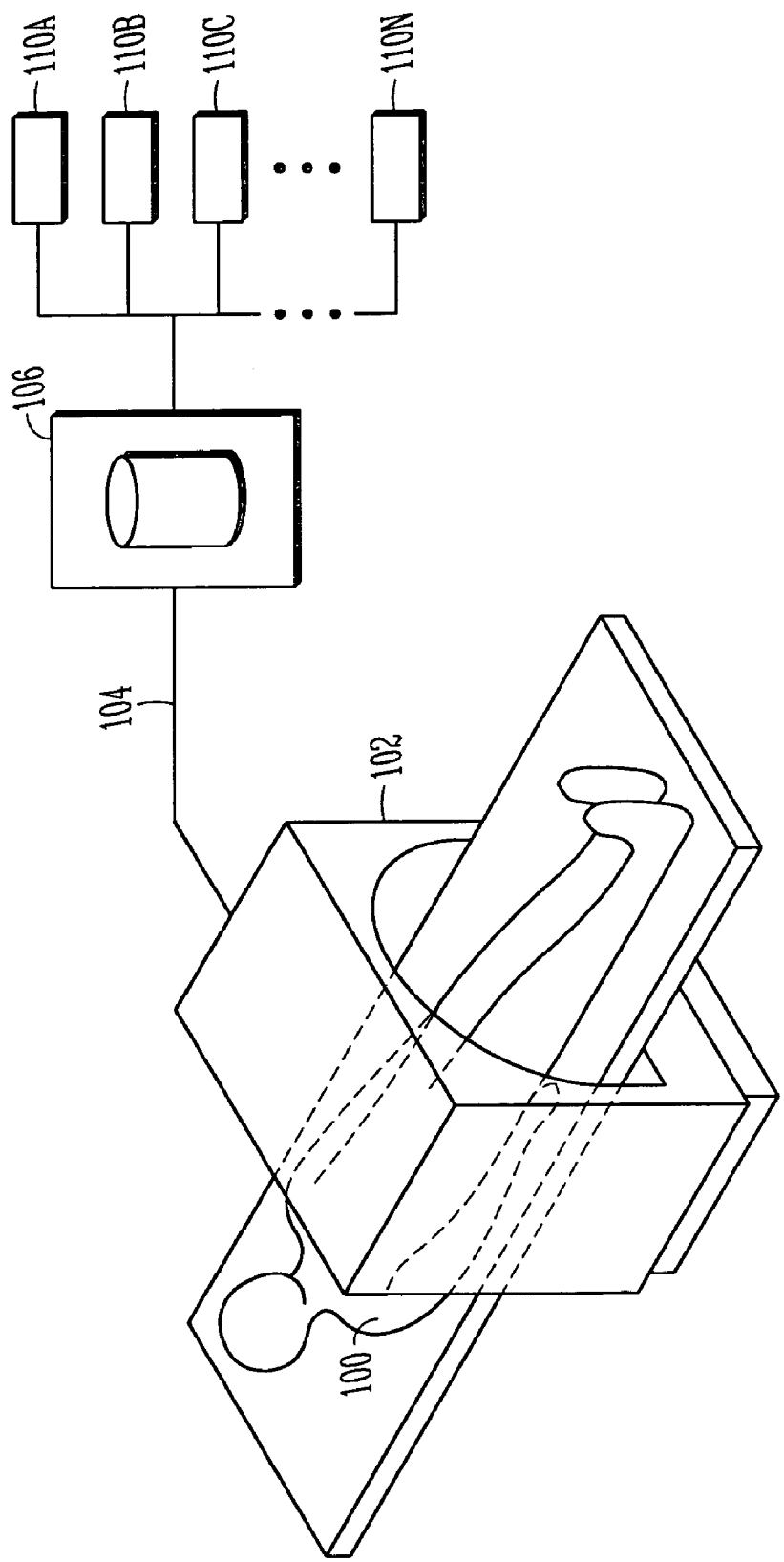
FIG. 1 is a schematic view of a medical scanner, an image storage device, and one or more image processing stations.

FIG. 1 illustrates an example of a system that may use this characteristic path data. In this example, a patient 100 is scanned by a typical medical imaging scanner 102. Examples of a medical imaging scanner 102 include, without limitation, a CT scanner and a magnetic resonance imaging (MRI) scanner. The scanner 102 is typically connected to a storage system 106, such as by a data pathway 104. The data pathway 104 is typically a local area network (LAN) and the storage system 106 is typically an image server. In this example, the storage system 106 is connected to one or more image processing stations 110A, 10B, 110C, . . . , 110N, by a second data pathway 108, which is typically a LAN.

Figure 2:
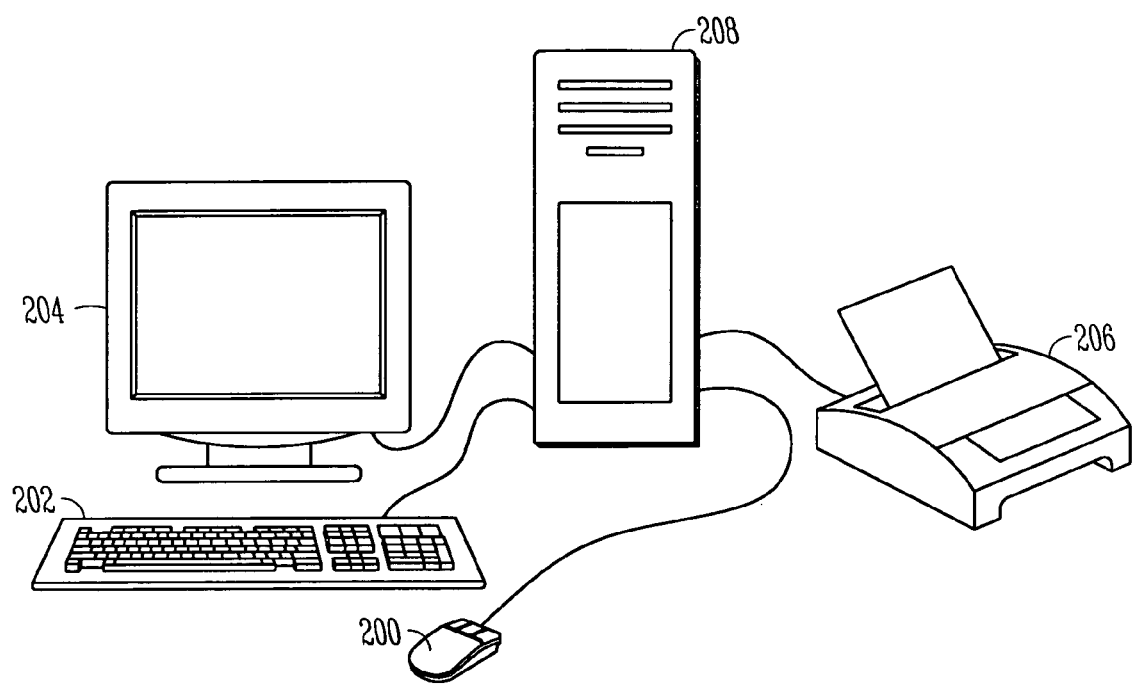
FIG. 2 is a schematic view of an exemplary image processing station.

FIG. 2 illustrates a typical image processing station 110. In this example, the image processing station 110 includes one or more input devices 410, such as a mouse 200 and a keyboard 202, one or more output devices 412, such as a display 204 and a printer 206, and a control unit 208, which may include a processor, a local memory, and additional hardware to control communication between internal and external devices. The image processing station computes a segmentation using the images stored at the storage system 106. The segmentation separates the data representing an object of interest (e.g., a colon) from other nearby objects represented in the data, such as by using image intensity or other information to make such distinctions. A user can use an image processing station 110 to perform a method that includes generating a complete segmentation of a disconnected colon using characteristic paths. One example of this method is discussed below.

EXAMPLES

Figure 3:
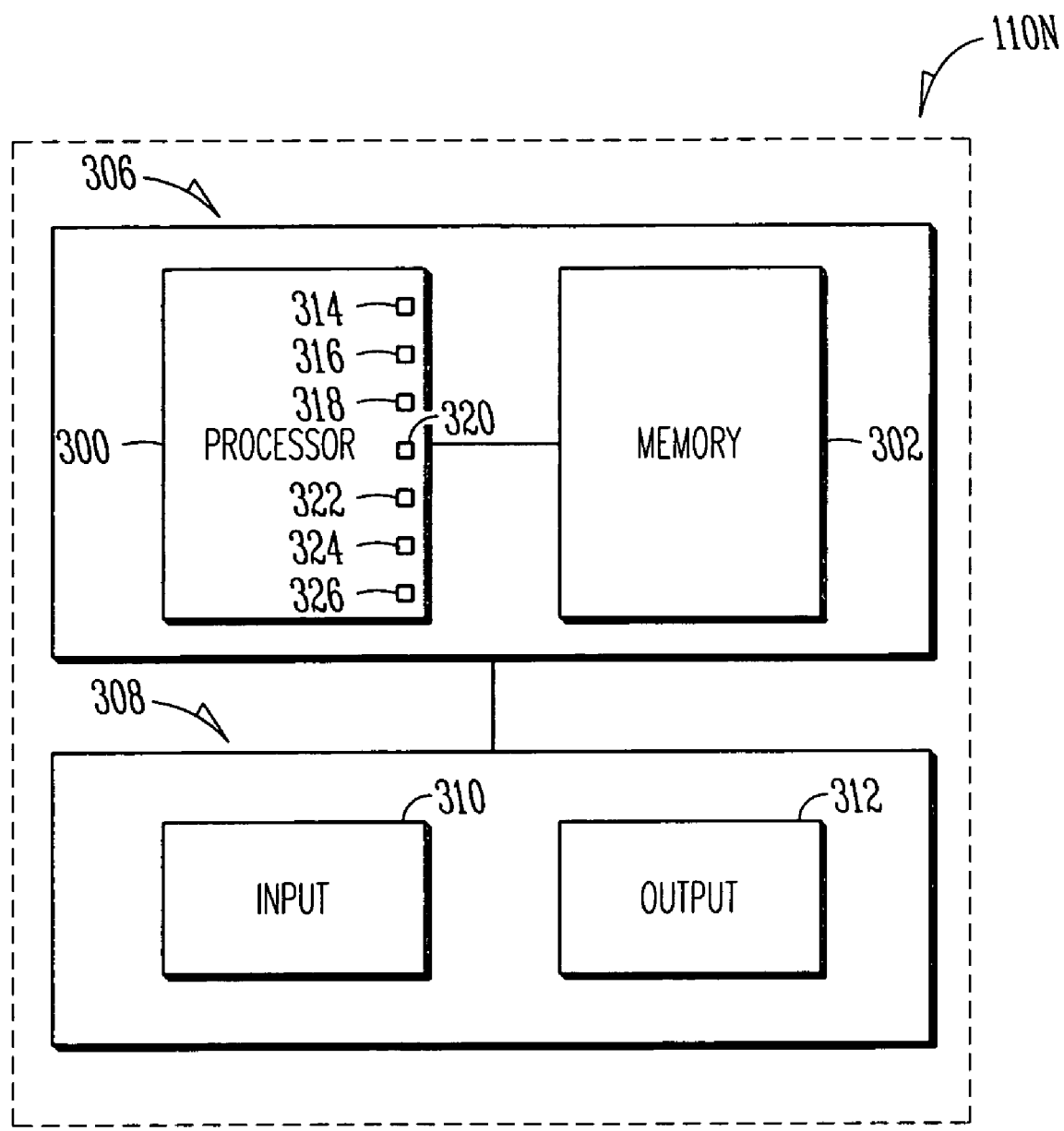
FIG. 3 is a schematic view of a system used to calculate a characteristic path.

FIG. 3 illustrates portions of a system 110 that is capable of automatic assembly of one or more segments that represent a colon. In this example, a processor 300 is connected to interact with a memory 302. A wide array of possible processor and memory combinations are available. Processors 300 may include commercial units (e.g. Pentium, Motorola 68000 series, PowerPC) or specialized units made for use in specific applications. The memory 302 can include any memory, such as solid-state, magnetic, or optical media.

A user-interface 308 is typically connected to the processor-memory combination 306. This user-interface 308 typically includes an input device 310 and an output device 312. The input device 310 can be one or more of a keyboard, a mouse, a touchpad, a microphone, a sensing device, a monitoring device, or any other type of device that allows a computer to receive commands and input data from a user. The output device 312 can include such things as a monitor, a printer, a speaker, or any other type of device that allows a system to represent resultant data to the user.

In one example, a user can input a command with an input device 310 that obtains a series of axial scans. The scans are then used by the processor-memory combination 306 to create a segmentation of the colon.

First, areas in the scans with low contrast are identified and separated by Air Mask Extraction module 314. Then, any areas with a high contrast are identified and separated in the Tagged Stool Extraction module 316. The Landmark Identification module 318 determines one or more landmark segments (e.g., the rectum and cecum). Then, characteristic paths are generated for all segments in the abdomen by the Characteristic Path Generation module 320. The paths are connected by the Path Connection module 322 and then merged in the Path Merger module 324. Finally, a new characteristic path is generated using the completely merged and continuous colon segmentation by the Post-processing module 326. Then, in one example, the results are displayed on the output device 312 for the user.

Determining the Set of Candidate Segments

Figure 4:
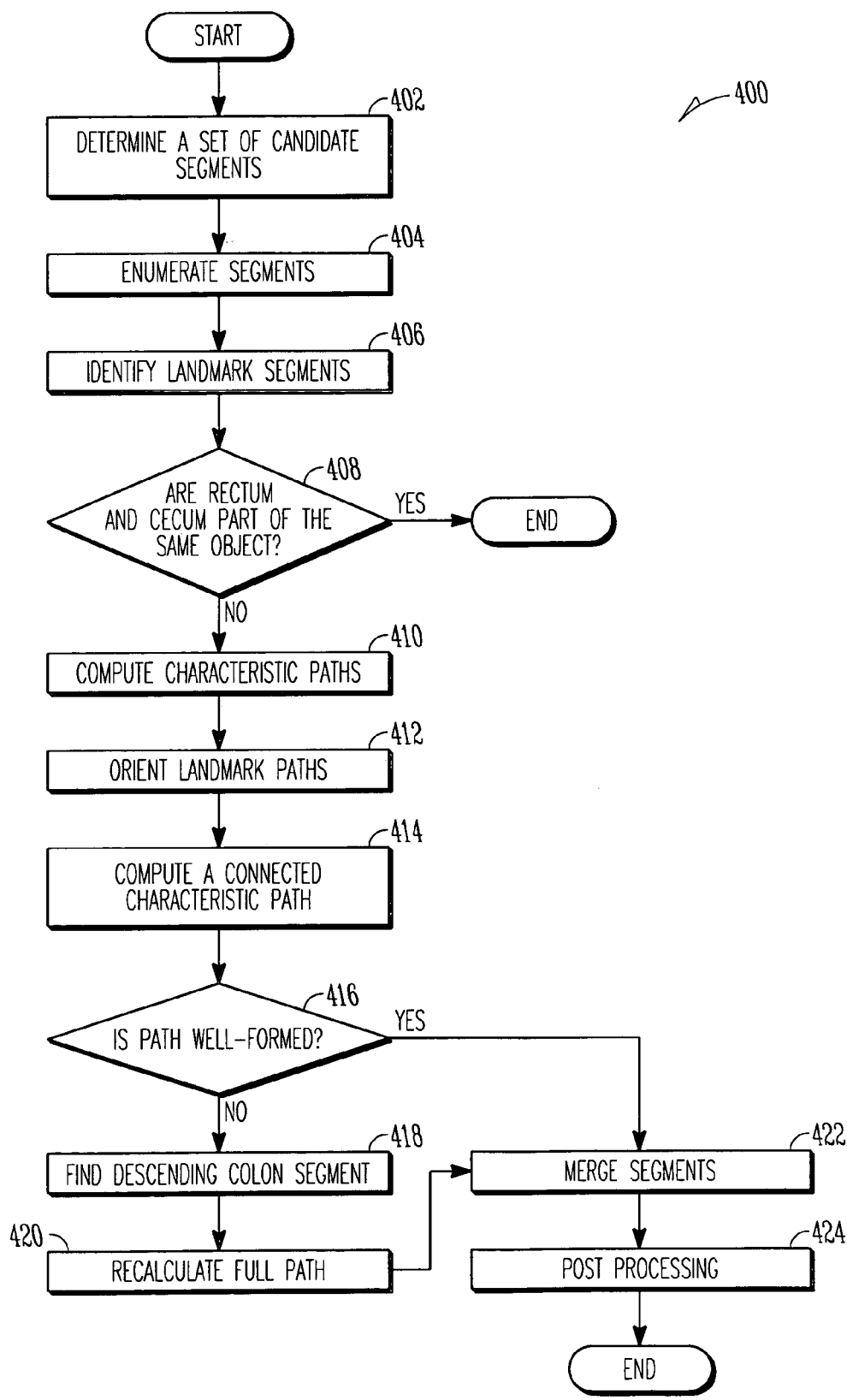
FIG. 4 is a flowchart illustrating generally the process of calculating a combined three-dimensional object from one or more fragments.

FIG. 4 is a flowchart illustrating an example of a method 400 for automatically calculating a complete colon segmentation from one or more segments. At 402, candidate segments, those that are likely portions of the colon, are identified and separated. In one example, this is performed by first finding all regions that represent external air, then identifying any regions that represent the lungs or the scanner table, and finally, subtracting these regions from the domain of all airlike voxels in the volume. This process will typically produce regions that represent abdominal air. In addition, any stool that has been identified will be included as part of the abdominal air region. The regions that are the result of this process are identified as candidate segments.

Air Mask Extraction

Figure 5:
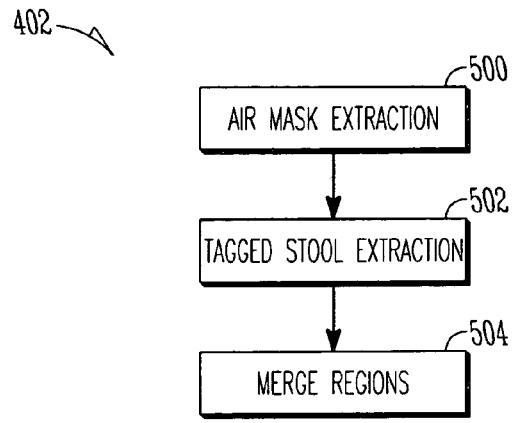
FIG. 5 is a flowchart illustrating generally the process of determining abdominal regions of interest.

FIG. 5 is a flowchart illustrating an example of a method 402 for determining a set of candidate segments. At 500, a mask containing the abdominal air, $M_{abd}$, is extracted. First, $M_{ext}$, a mask containing the external air surrounding a patient is extracted. In this example, one or more seeds are chosen from extreme x and y positions in the boundary planes of the voxel space. These seeds are used in a region-growing technique to determine the external air mask.

Figure 7:
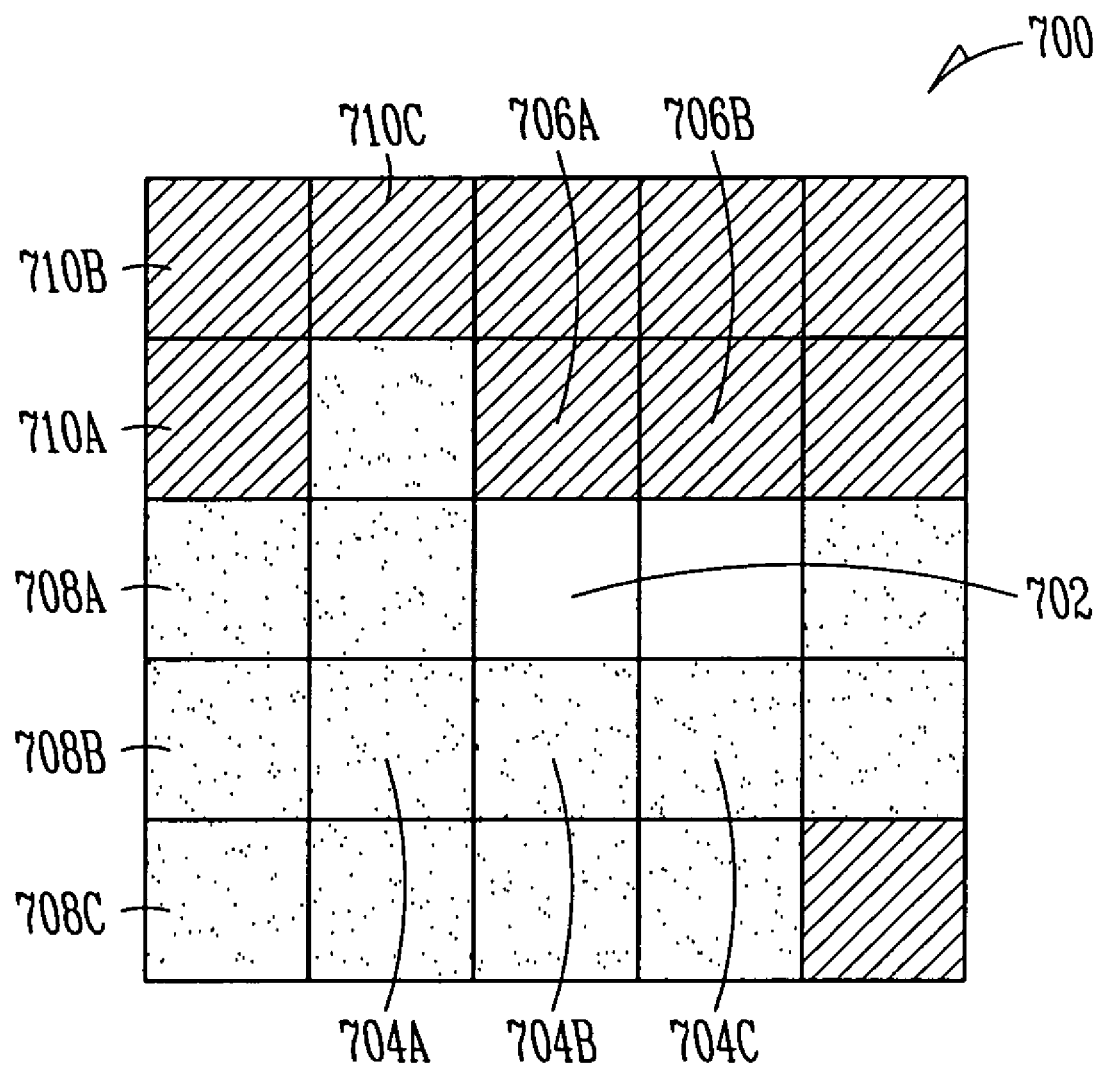
FIG. 7 is a planar view of a set of voxels with varying image intensities.

FIG. 7 illustrates a thresholded region-growing process. For simplicity, a volumetric voxel space 700 is reduced to two dimensions for illustration. A seed voxel 702 is chosen and a threshold is defined (not shown). Typically, the threshold is a maximum or minimum allowable image intensity. In general, the space or volume is grown from the seed voxel 702 by adding adjacent voxels that are over or under the threshold intensity. This process is continued until all adjacent voxels that are over or under the threshold intensity are included. In this example, the threshold defines a maximum intensity. So, in the first iteration of the region-growing process, voxels that are adjacent to the seed voxel 702 and have a sufficiently low intensity values (e.g., 704A, 704B, 704C) such that they do not exceed the threshold value are added to a current total voxel space. Adjacent voxels that exceed the threshold (e.g., 706A, 706B) are not added to the voxel space. In the second iteration, voxels that are adjacent to the current total voxel space are evaluated and those that are under the threshold (e.g., 708A, 708B, 708C) are added, whereas those that exceed the threshold (e.g., 710A, 710B, 710C) are ignored. This process is continued until all voxels under consideration in a certain iteration exceed the threshold value.

In this example, when calculating $M_{ext}$, the image intensity threshold, $\tau_{ext}$, is chosen to be relatively lax. In general, it is assumed that a substantially thick layer of intermediate intensities (e.g., skin and clothes) border the external air volumes. Thus there is not much likelihood of including regions that represent internal air pocket in $M_{ext}$. One example uses $\tau_{ext}=-324$ Hounsfield Units (HU, where 0 HU is the radiodensity of distilled water and $-1000$ HU is the radiodensity of air) with a sample space along a k×k regular grid, where $k=5 \cdot 2^{-R}$, where R is a constant that corresponds to the current spatial sampling rate of the volumetric data. In this example, a Resolution Ratio (RR) is used to describe the level of sampling. The Resolution Ratio RR1 is the highest resolution with every voxel represented, RR2 is one half of RR1 resolution, and RR4 is one fourth of RR1 resolution. The constant R is then defined as R=2 for RR4, R=1 for RR2, and R=0 for RR1. Typically, using a larger sample space provides for faster extraction of the external air mask.

Figure 8:
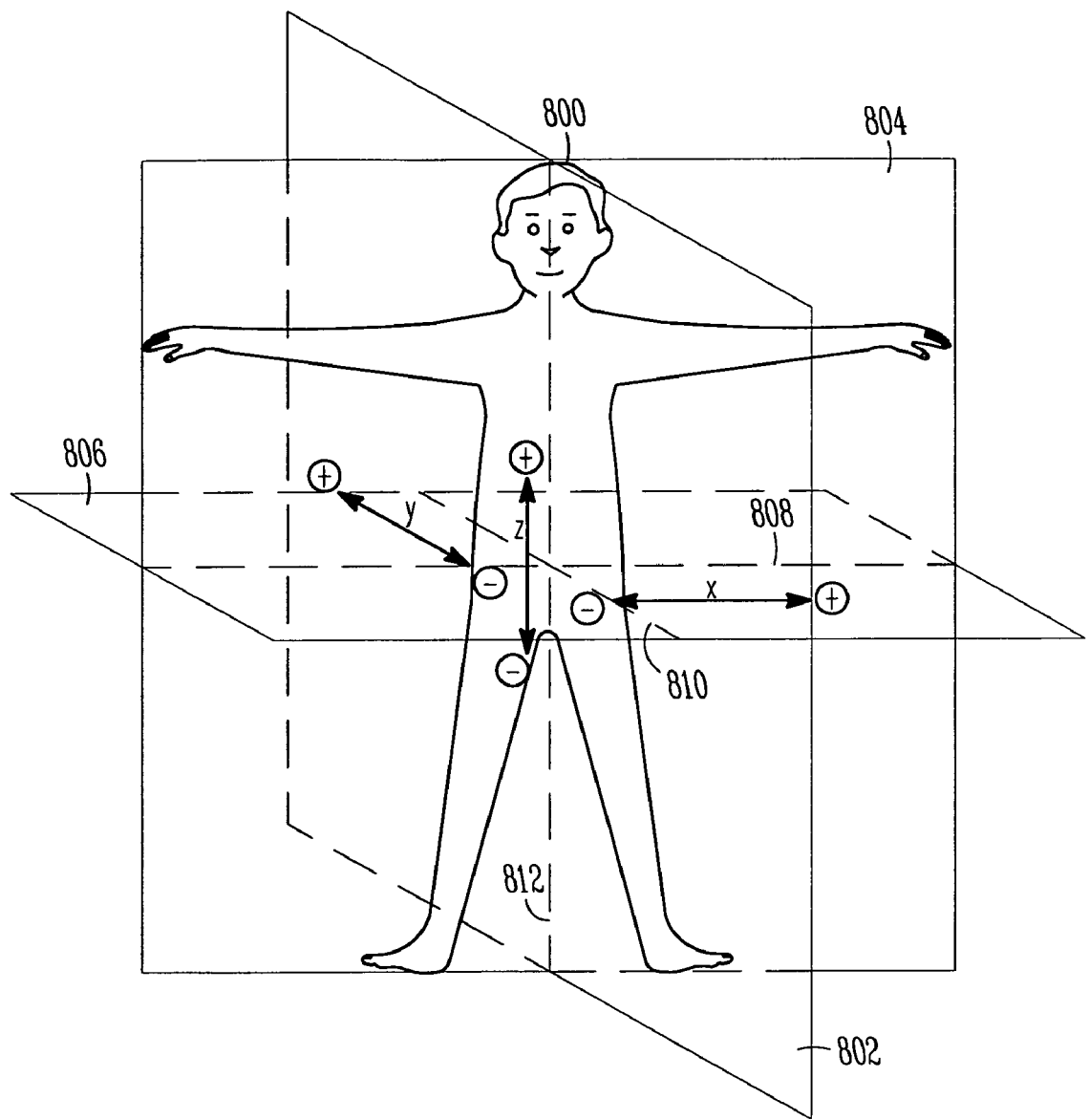
FIG. 8 is a schematic view of three orthogonal planes with reference to human anatomy.

FIG. 8 illustrates the three planes that define a volumetric scan in this context. The illustration depicts a patient's body 800 in the conventional orientation. The sagittal plane 802 is the median plane of the body or any plane parallel to it, which divides the body into right (i.e., proximal) and left (i.e., distal) parts. The sagittal plane 802 is defined by the y-axis 810 and the z-axis 812. The coronal plane 804 is a plane that divides the body into a forward (i.e. anterior) and back (i.e., posterior) parts. The coronal plane 804 is defined by the x-axis 808 and the z-axis 812. The axial or transverse plane 806 is a plane perpendicular to the sagittal plane 802 and the coronal plane 804 and divides the body into a top (i.e., superior) and bottom (i.e., inferior) parts. The axial plane 806 is defined with the x-axis 808 and the y-axis 810.

After the external air is segmented, the patient's lungs and possibly the scanner table are identified in $M_{lt}$, a mask containing the lungs and table. In this example, to find the lungs, the top-most slice (e.g., the axial slice with the highest z value or the most superior slice) is chosen and thresholded region growing is performed on all voxels that are not part of the external air mask. In one example, the maximum image intensity threshold is defined as $\tau_{lt}=-500$ HU, which is more restrictive than the external air threshold because of the possible close proximity of the lungs to the colon, but relaxed enough to allow the process to permeate the extents of the lungs. In this example, boundaries are defined such that the growing region cannot extend below some inferior slice. This accounts for the cases when a portion of the colon was included in the most superior slice. In one example, the inferior threshold slice is computed as ⅔ of the overall axial span of the volume.

Figure 9:
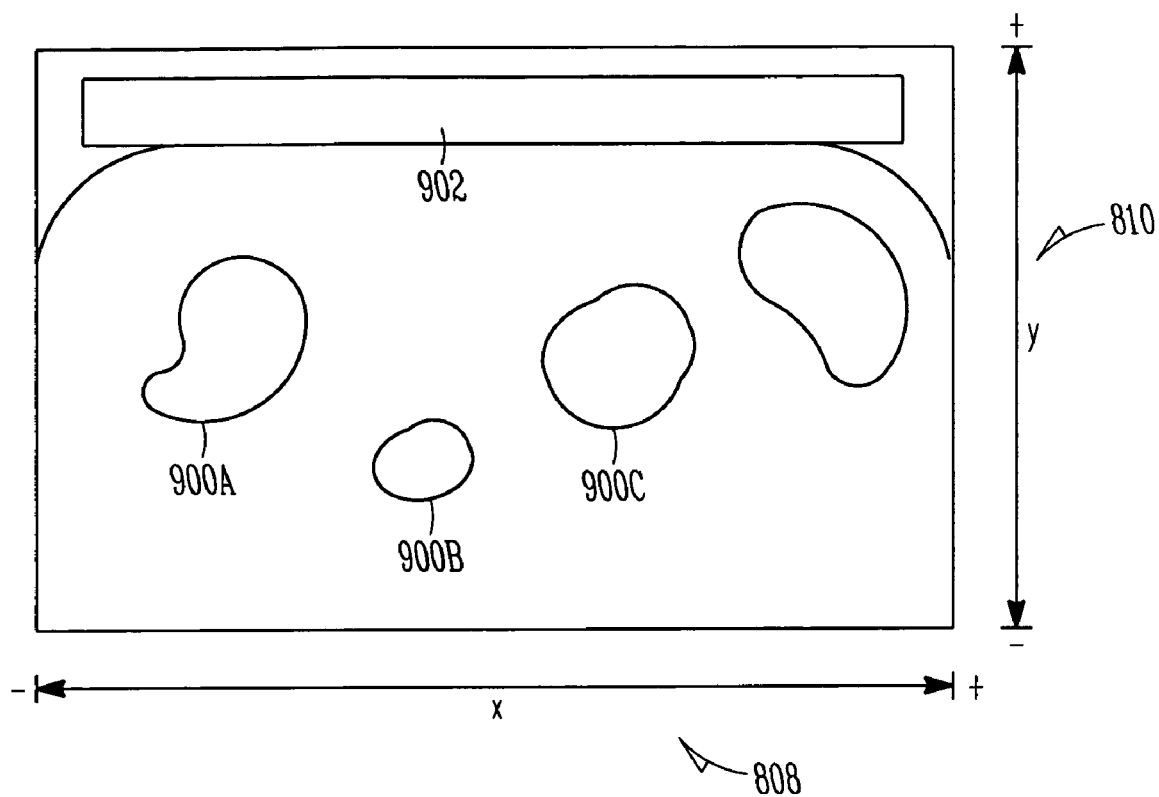
FIG. 9 is a schematic view of a biological image slice.

The scanner table is typically also detected using the most superior slice. In this example, if there exists a region that spans more than half the x-span of the volume, it is considered a part of the table and is added to the $M_{lt}$, mask. FIG. 9 illustrates an exemplary axial scan showing several internal air-filled regions (e.g., 900A, 900B, 900C) and the table 902. By convention, the axial plane is defined by the x 808 and y 810 axes. In this illustration, the table 902 spans more than half of the x-span of the volume and can typically be confidently identified as the table as no other object has similar characteristics.

Once any regions that represent the lung, table, and external air voxels have been identified, the mask of the abdominal air, $M_{abd}$, is extracted as the complement of all air-like voxels in the volume with the two masks, $M_{ext}$ and $M_{lt}$. In this example, to determine the mask of all air-like voxels, $M_{air}$, a relatively strict threshold, $\tau_{air}=-825$ HU, is used. In general, this can be represented by $M_{air}=\{v|I(v)\leqq\tau_{air}\}$, where v is a voxel in the mask $M_{air}$ and I(v) is the intensity of a voxel measured in Hounsfield Units. Although this strict threshold potentially disconnects or excludes portions of the colon altogether, the strictness prevents false connections between the large and small bowel, as well as inappropriate connections of the colon to itself. Optionally, an adaptive threshold could be used, such as one based on the specific characteristics of a particular scan.

Tagged Stool Extraction

In some cases, a patient may be administered a high-contrast stool-tagging agent, such as barium sulfate or ionic iodine solution, as part of their preparation for a virtual colonoscopy. When this occurs, such high-contrast stool voxels in the volume should be included in the region of interest (e.g., the colon). At 502, tagged-stool is identified and extracted. In this example, a mask of high-contrast voxels is generated from the volume. This mask, $M_{tag}$, uses a threshold of $\tau_{tag}=276$ HU, and can be defined as $M_{tag}=\{v|I(v)\geqq\tau_{tag}\}$, where v is a voxel in the mask $M_{tag}$ and I(v) is the intensity of a voxel measured in Hounsfield Units. However, the relatively high intensity values of bone results in the inclusion of the spine, lower ribcage, and pelvis among the tagged-stool candidate voxels. To separate the tagged-stool from these bone regions, as well as from other possible regions with high intensity, the high-intensity regions are analyzed with respect to the previously obtained air-filled regions.

In particular, in this example, high-intensity regions that share a surface, which is mostly flat, with a previously identified air-filled region, and that have normals pointing in the coronal direction (i.e., a surface plane that is parallel to the ground when the patient is lying down), are considered likely to be liquid stool that is settled adjacent to air and their volumes are merged. To find these adjacent regions, first, surface meshes are computed for both the air and the stool volumes. In this example, the surface meshes are created by a marching cubes technique, which defines a triangular surface mesh. After the meshes are formed, patches of triangles are selected from the air mask whose normals point positively along the coronal axis (negatively in the case of a prone scan). These patches are considered candidates of interfaces between air and liquid stool. Voxels are selected from the surface mesh triangles that compose the intersection and are used as seeds for growing regions. At 504, the areas that define the intersection and the mask that defines the tagged stool, $M_{tag}$, are added to the mask $M_{abd}$, the collection of all voxels representing abdominal air. The result is an augmented mask $M_{abd}$, which defines the set of candidate segments.

Enumerating Connected Segments

At 404, the candidate segments in the $M_{abd}$ are indexed and, for each segment, certain volumetric statistics are calculated and stored. In this example, each segment is determined by successive region growing in $M_{abd}$ until all voxels in $M_{abd}$ have been visited. In one example, a minimum voxel volume is imposed to filter out "dust" segments—those that are insignificant. In this example, the minimum voxel volume is set as $10 \cdot 8^{2-R}$. The remaining segments $S_1, S_2, \ldots, S_i$ are then analyzed and each segment's volumetric statistics, which include the bounding box $\{(\underline{x}_i, \underline{y}_i, \underline{Z}_i), (\overline{x}_i, \overline{y}_i, \overline{z}_i)\}$ and voxel distance-to-surface map $D(S_i)$, are calculated and stored. The distance-to-surface map $D(S_i)$ is calculated by assigning each voxel in a segment a value equal to the shortest distance to a surface. Once the bounding boxes and distance-to-surface maps for all segments have been computed, the volumetric statistics are normalized to the interval [0,1] using a linear transformation.

Identifying Landmark Segments

At 406, the segments' volumetric statistics are analyzed to identify landmark segments. In this example, the landmark segments of interest are the rectum segment and the cecum segment. In other examples, the landmark segments of interest may include the descending colon, the transverse colon, or other identifiable portions of the colon. To find the landmark segments, certain generalized anatomical knowledge is typically used to create probability functions.

In general, the rectum is positioned at low axial values (toward the bottom of the torso) and high coronal values (toward the back of the torso). These characteristics are represented by a low $\underline{z}_i$ value and a high $\overline{y}_i$ value. The rectum is also typically less tubular and more voluminous than other abdominal chambers and therefore some interior voxels should have a relatively high distance-to-surface value. Finally, the rectum is typically positioned in the lower axial region, which allows the search to be refined by only considering the lower half of the volumetric representation. Combining these characteristics, the most likely rectum segment $S_{rect}$ can be computed as the maximization of:

$$f_{rect}(i) = (1.0 - \underline{z}_i) + \overline{y}_i + \max\left\{d_j \in D(S_i) \bigg| z_j \leq \frac{1}{2} dim_z\right\}$$

The cecum segment can be found using a similar process. The cecum is typically positioned at low sagittal values (toward the patient's right side). This can be represented with a low $\underline{x}_i$ value. It is also typically more voluminous than other abdominal chambers. Thus, the interior voxels should exhibit a relatively high distance-to-surface value. Finally, because the cecum is typically positioned toward the patient's right side, the method 400 can be tuned by restricting the search to the lower sagittal range. Thus, using these characteristics, the most likely cecum segment $S_{cec}$ can be computed as the maximization of:

$$f_{cec}(i) = (1.0 - \underline{x}_i) + \max\left\{d_j \in D(S_i) \bigg| x_j \leq \frac{1}{2} dim_x\right\}$$

At 408, the segments $S_{rect}$ and $S_{cec}$ are compared and if they refer to the same segment, then the method 400 deems that the colon is represented as a single segment of $M_{abd}$.

Generating Characteristic Paths and Orienting the Paths

At 410, a characteristic path $P_i$ is generated for each colon candidate segment $S_i$. In one example, for each segment, the path is generated by first generating a surface mesh over the virtual volume. Then, a reference triangle in the surface mesh is calculated and used as the starting point for generating distance values for all triangles on the mesh. After every triangle has been assigned a distance value, one or more distance values are grouped to form "rings" around the virtual volume. The centroids of these rings are calculated and used to form a characteristic path. Examples of generating a characteristic path are described in commonly assigned Samuel W. Peterson U.S. patent application Ser. No. 11/273,938 entitled SURFACE-BASED CHARACTERISTIC PATH GENERATION, which was filed on Nov. 15, 2005, and which is incorporated by reference herein in its entirety, including its description of examples of generating characteristic paths.

Thus, a characteristic path is defined by a sequence of two or more points in 3D space. Generally, a path begins at the first point in the sequence (i.e., the start point) and continues until the last point in the sequence (i.e., the end point). This sequencing gives a path an orientation or alignment. Optional post-processing may be used to prune and smooth the resulting path. Other examples may use thinning, distance maps, or other techniques to generate characteristic paths representing the colon candidate segments.

Figure 6:
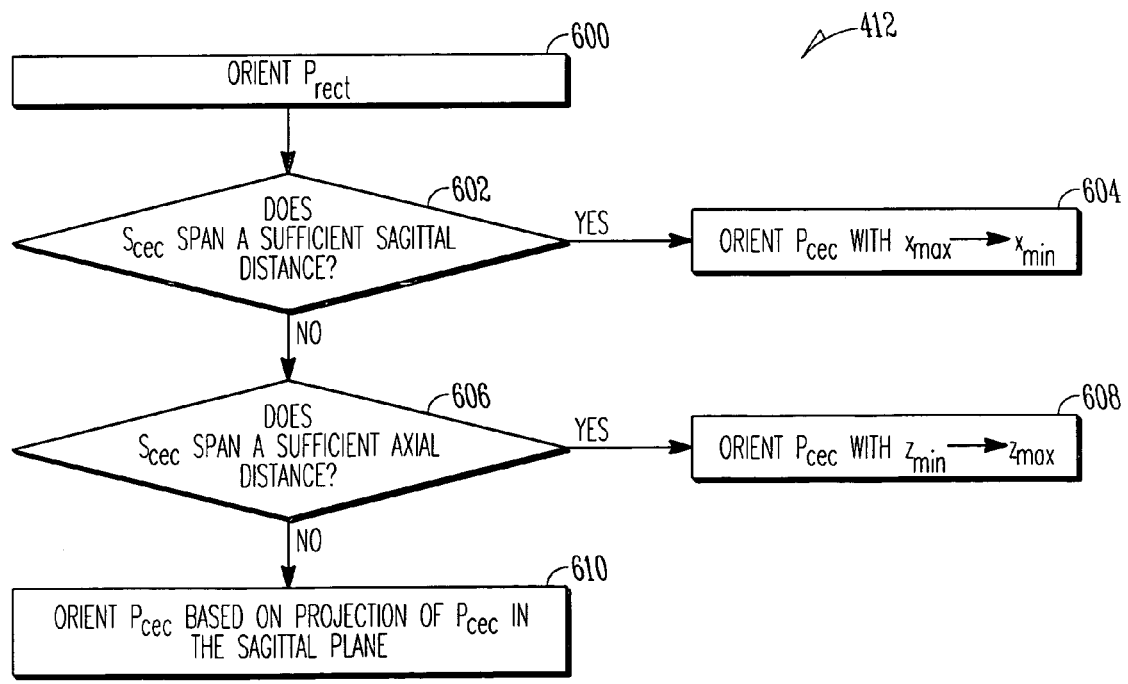
FIG. 6 is a flowchart illustrating generally the process of orienting the rectum and cecum characteristic paths.

At 412, once a path for each colon candidate segment $S_i$ is calculated, the paths that represent the landmark segments $S_{rect}$ and $S_{cec}$ are oriented to be consistent with a particular desired flythrough direction (e.g., from the rectum to the cecum). FIG. 6 is a flowchart illustrating an example of orienting landmark paths. In this example, the starting point of the path in $S_{rect}$ is computed using a weighted function that reflects the normal anatomy. In general, the typical flythrough path originates at the anus, thus the initial seed is located in a very low region (a small z value) and toward the rear of the patient (a positive y value). Thus, in one example, the initial seed point for the rectum segment can be calculated by finding the maximum of:

$$rect(y, z) = -y_{scale} \cdot y - \omega_z \cdot z_{scale} \cdot z$$

where $\omega_z$ is a weight, in this example $\omega_z = 10$. The $y_{scale}$ and $z_{scale}$ are provided by the particular scanner and are used to make the voxel space isotropic.

The characteristic path of $S_{rect}$ is generated from the initial seed point. 600, the method 400 can quickly and correctly orient the path through the rectum $P_{rect}$ by assigning the initial seed point (or the endpoint of the calculated path that is nearest to the initial seed point) the beginning of $P_{rect}$.

However, because the shape of the cecum can vary significantly among scans and because the characteristic path's starting end is chosen arbitrarily, the path through the cecum $P_{cec}$ may not be oriented consistent with the desired flythrough path. To correctly orient $P_{cec}$, the method 400 typically uses a combination of generalized anatomical knowledge and specific volumetric statistics. In this example, the shape of the cecum segment is analyzed using a multi-step method and depending on one or more categorizations of the shape, the orientation of the path $P_{cec}$ may be adjusted.

First, at 602, the segment $S_{cec}$ is analyzed to see if it spans a sufficient sagittal distance. In this case, the sagittal distance is meant as the direction normal to the sagittal plane (e.g., the x-axis). In one example, a sufficient sagittal distance is 50% of the total sagittal distance of $M_{abd}$. Using a relatively large percentage as the threshold provides a higher probability that the cecum segment, which will likely include the transverse colon segment, is properly identified. At 604, if $S_{cec}$ spans a sufficient sagittal distance, the path $P_{cec}$ is oriented such that the point with the maximum x value precedes the point with the minimum x value.

At 606, if $S_{cec}$ does not span a sufficient sagittal distance, then $S_{cec}$ is analyzed to see if it spans a sufficient axial distance. In this case, the axial distance is meant as the direction normal to the axial plane (e.g., the z-axis). In one example, a sufficient axial distance is 20% of the total axial distance Of $M_{abd}$. At 608, if $S_{cec}$ spans a sufficient axial distance, then $P_{cec}$ is oriented such that the point with the maximum z value is the start of the path.

At 610, if it is determined that $S_{cec}$ does not span a sufficient sagittal distance and does not span a sufficient axial distance, then the method 400 orients $P_{cec}$ based on its projection of its characteristic path onto the sagittal plane. In some cases, the hepatic flexure folds the colon in front of itself in the sagittal plane (behind itself from the patient's perspective), so the path $P_{cec}$ is oriented such that it sweeps out a clockwise path in the sagittal projection.

Connecting Characteristic Paths

At 414, two or more characteristic paths are connected to form a complete path that starts at the rectum and ends at the cecum. In this example, the path that must be found begins at the end of $P_{rect}$ and terminates at the beginning of $P_{cec}$.

A cost network is constructed for the search. In general, when considering two segments, where each is not the rectum or cecum, moving from one segment's characteristic path $P_i$ to another segment's characteristic path $P_j$ can be accomplished in four ways (e.g., from the start of $P_i$ to the start of $P_j$; from the start of $P_i$ to the end of $P_j$; from the end of $P_i$ to the start of $P_j$; and from the end of $P_i$ to the end of $P_j$). Each of these distances are represented as a local cost and a total cost. In certain examples, the local cost function $c_{loc}(i,j)$=the linear distance from the end of $P_i$ to the start of $P_j$ and the total cost function $C_{tot}(i,j)$=the squared distance from the end of $P_i$ to the start of $P_j$. Thus, the cost network provides a graph with the source node as the starting point of the path (e.g., the end of $P_{rect}$), each internal node represents endpoints that the could occur next in the path, and a destination node that represent the final endpoint (e.g., the start of path through the cecum $P_{cec}$). Each edge that connects two nodes has a cost associated with it, which in this example is total cost (the squared distance between two points).

Various methods can be used to determine an optimal solution in a graph or tree structure. In certain examples, a search based on a branch-and-bound technique is used to determine a minimum path from $P_{start}$ to $P_{end}$ (e.g., $P_{rect}$ and $P_{cec}$). Several methods based on the branch-and-bound technique can be used to search a cost tree. In one example, a branching search is used. In general, a branching search recursively divides the search space into smaller regions in a search for a solution. This approach can be used in combination with dynamic programming. Other examples may use a bounding method to search a cost tree. One example of a bounding method defines an upper bound and prunes any regions of a search tree that has a cost that exceeds the upper bound. The result is a pruned search tree with paths that do not exceed the global threshold. Other examples may use traditional depth-first or breadth-first searches in an attempt to find a solution. The branch-and-bound methods may be used in combination with the traditional methods.

In this example, an upper boundary defining a maximum local and total cost is used to limit the search space. The maximum local cost is initially set to maximum of the distance from the end of the rectum segment to the start of the cecum segment or 5% of $M_{abd}$'s bounding box's diagonal span. The maximum total cost is the square of the distance from the end of the rectum segment to the start of the cecum segment. The search of the cost network is then performed using a thresholded depth-first search in one or more iterations until a solution is found. After each unsuccessful iteration, the maximum local cost is incremented, such as at intervals of 5% of the diagonal span of the bounding box of $M_{abd}$ until it exceeds an upper boundary. In this example, the upper boundary is defined as the distance from the end of the rectum segment to the start of the cecum segment. Consequently, if the initial maximum local cost is set at this distance, there will only be one iteration of the search. In certain examples, the maximum total cost value can also be incrementally increased to some threshold value. As a natural side-effect of the cost-minimization process, the segments that produced characteristic paths, but were not part of the colon, are automatically excluded. The final result of the search is a sequence of paths $\{P_{rect}, P_1, P_2, \ldots, P_{cec}\}$, which reflects a corresponding sequence of segments $\{S_{rect}, S_1, S_2, \ldots, S_{cec}\}$. The sequence of paths is reoriented to reflect the typical flythrough direction from rectum to cecum. In certain examples, the sequence of paths is used to assist a flythrough of a disconnected colonic segmentation by transporting a user's viewpoint from the end of one segment to the beginning of the next based on the sequence of the corresponding paths.

Recalculating a New Path

At 416, a final path, which is a sequence of characteristic paths, is analyzed to see if it is well-formed. In this example, the test for whether the final path is well-formed includes two factors: the total path length and the average x value of the entire path. In this example, the total path length is compared to the sum of the x, y, and z lengths of the path's boundary box. Specifically, in this example, if the total length of the colon path is not greater than 140% of the sum of the dimensional lengths, then the path is considered not well-formed (i.e., a major portion is missing). Another factor in determining whether the path is well-formed is the average x value of the entire calculated characteristic path. The descending colon typically resides on a patient's left side. When a patient is scanned the descending colon's position typically contributes a large proportion of positive x value to the average x value. Thus, if the average x value too low, this example assumes that the descending colon was excluded from the characteristic path and so the path is not well-formed. In this example, a normalized x value (e.g., the average x value divided by the span of x in the bounding box) of −0.008 is used as the threshold value. For the path to be considered well-formed, in this example, the path must pass both tests. If the path is considered not well-formed, the descending colon is identified and forcibly included in the total characteristic path.

To include the descending colon, first, at 418, when the path is determined to be erroneous, the method 400 identifies a descending colon segment $S_{desc}$. In this example, a descending colon segment $S_{desc}$ is identified as a segment of $M_{abd}$ that has the greatest number of axial slices in which it is the maximal sagittal (left-most from the patient's perspective) segment.

Because every candidate segment had an associated characteristic path generated, the segment $S_{desc}$ already has a characteristic path $P_{desc}$ generated from a previous step. The orientation of this path is checked and is adjusted, if necessary, such that the point with the minimum z value is the start of the path. This orientation is consistent with a typical flythrough path.

At 420, a new sequence of paths is determined using a cost network and a branch-and-bound technique. In this example, to forcibly include the descending colon segment, the search will determine a first minimum path from $P_{rect}$ to $P_{desc}$ and a second minimum path from $P_{desc}$ to $P_{cec}$, excluding the segments used in the $P_{rect}$-$P_{desc}$ path. The final path is the combination of these two minimum paths from $P_{rect}$ to $P_{cec}$. The final path, which is a sequence of characteristic paths, is reoriented to reflect the typical flythrough direction from rectum to cecum. As described above, the sequence of paths can be used to assist a flythrough of a disconnected colonic segmentation.

In certain examples, a well-formed final path is used to determine the set of relevant and non-relevant segments in the segmentation. The segments that have characteristic paths that make up the well-formed path are considered colonic, with everything else considered extra-colonic.

Merging Segments

At 422, the sequence of paths $\{P_{rect}, P_1, P_2, \ldots, P_{cec}\}$ are merged. A fusion mask $F_i$, which defines the segments that connect the sequence of paths is calculated. Given a path $P_i$ and a successive path $P_{i+1}$, in the sequence of paths, let $c_i$ be the end point of the path $P_i$ and $c_{i+1}$ be the start point of $P_{i+1}$. Initially, there is an implied straight-line connection between $c_i$ and $c_{i+1}$. While the straight-line connections could be used to form the final characteristic path, these type of connections are not representative of the actual colonic structure. In order produce a better representation, the method 400 analyzes image intensities in a bounded region to find a probable connecting segment.

In one example, the merging is performed using Djikstra's path search. For example, when connecting two paths $P_i$ and $P_{i+1}$, a cost network based on the voxel intensities in the original volume is used. To reduce processing, a minimization search can alternatively consider voxel intensity ranges. In this example, the image intensities are ordered by increasing intensity into groups with a size of 50 HU, starting with all voxels in $M_{air}$ in the first group. Thus, the first grouping would be defined by the interval [−1024 HU, −825 HU], the second grouping defined by the interval [−825 HU, −775 HU], the second grouping defined by the interval [−775 HU, −725 HU], and so on. Alternatively, if a stool tagging agent was used, the voxels in the mask $M_{tag}$ are included in the first group and all other voxels are grouped according to their intensity difference from one half of the sum of the threshold of air regions $\tau_{air}$ and the threshold of tagged stool regions $\tau_{tag}$. In this example, $\tau_{tag}$=276 HU and $\tau_{air}$=−825, so ½($\tau_{air}$+ $\tau_{tag}$)=½(−825+276)=−274.5 HU. Thus, the first grouping would be defined by those voxels with intensities less −825 HU and those voxels in the tagged mask. The second grouping would be defined as voxels with intensities −274.5±25 HU. The next grouping would be defined as those voxels with intensities in the intervals [−299.5 HU, −324.5 HU] and [−249.5 HU, −224.5 HU], and so on.

In one example, for faster execution, the search is limited to be within a radius of $3 \cdot 2^{2-R}$ voxels of the bounding box formed by the end of $P_i$ to the start of $P_{i+1}$. To establish the bounding box, let $c_i$=($x_i$, $y_i$, $z_i$) be the end point of the path $P_i$ and $c_{i+1}$=($x_{i+1}$, $y_{i+1}$, $z_{i+1}$) be the start point of $P_{i+1}$. Then the bounding box is defined as $\{(\min(x_i, x_{i+1}), \min(y_i, y_{i+1}), \min(z_i, z_{i+1})), (\max(x_i, x_{i+1}), \max(y_i, y_{i+1}) \max(z_i, z_{i+1}))\}$. In this example, using Djikstra's path search typically results in a single voxel-wide path. In order to ensure an adequate connection, this path is dilated by one voxel. Each path in the sequence is connected in a similar manner and the collection of volumetric segments that connect these paths make up the fusion mask $F_i$. The final connected colon segmentation mask is then $$S = \left(\bigcup_{i=0}^{k} S_i\right) \cup \left(\bigcup_{i=0}^{k-1} F_i\right).$$

Post-processing

At 424, one or more post-processing steps could be performed using the final segmentation. In one example, a new characteristic path is computed using the final colon segmentation mask S. A new triangular surface mesh is computed using the complete colon segmentation S and the characteristic path is computed by using the rectum point as the reference triangle. The characteristic path is then generated using the method previously discussed. In another example, the final segmentation is used for display purposes. The entire segmentation alone or in combination with representations of intermediate steps (e.g., characteristic paths, connecting paths or segments, original data) can be displayed on one or more output devices. In yet another example, the final segmentation is used during a flythrough to keep track of unseen areas within the segmentation.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A computer-assisted method of using volumetric image data to construct a representation of a virtual organ, the method comprising:
    determining, using one or more computers, a set of one or more candidate segments in the volumetric image data;
    identifying, using the one or more computer, a set of one or more landmark segments from the set of candidate segments;
    computing, using the one or more computer, a characteristic path for each segment in the set of candidate segments; and
    creating, using the one or more computer, a first combined path by connecting the characteristic paths, wherein the connecting is performed using a cost network;
    orienting, using the one or more computer, the characteristic paths for the one or more candidate segments to be consistent with a start point and an end point,
    wherein the candidate segment is a cecum segment, and wherein orienting the associated characteristic path comprises:
        if the cecum segment spans a sufficient sagittal distance, then orienting the path such that an endpoint with a maximum x value precedes an endpoint with a minimum x value;
        if the cecum segment spans a sufficient axial distance, then orienting the path such that an endpoint with a maximum z value is the start of the path;
        if the cecum segment does not span a sufficient sagittal distance or a sufficient axial distance, then orienting the path by:
            projecting the path onto a sagittal plane to create a sagittal projection; and
            orienting the path such that it represents a clockwise path in the sagittal projection.

2. A computer-assisted method of using volumetric image data to construct a representation of a virtual organ, the method comprising:
    determining, using one or more computer, a set of one or more candidate segments in the volumetric image data;
    identifying, using the one or more computer, a set of one or more landmark segments from the set of candidate segments;
    computing, using the one or more computer, a characteristic path for each segment in the set of candidate segments; and
    creating, using the one or more computer, a first combined path by connecting the characteristic paths, wherein the connecting is performed using a cost network;
    determining if the first combined path is well-formed;
    if the first combined path is well-formed, then:
        reorienting each characteristic path in the first combined path to be consistent with a flythrough direction; and
        using the first combined path to determine a set of one or more connecting segments between one or more successive pairings of characteristic paths along the first combined path.

3. The method of claim 2, wherein the using the first combined path to determine one or more connecting segments includes connecting the end of a first characteristic path with the beginning of a second characteristic path using a straight line.

4. The method of claim 2, wherein using the first combined path to determine one or more connecting segments includes performing a Djikstra's path search from the end of a first characteristic path to the beginning of a second characteristic path.

5. The method of claim 2, comprising traversing a fragmented virtual three-dimensional object using the first combined path.

6. The method of claim 2, comprising identifying a set of relevant segments using the first combined path.

7. The method of claim 2, comprising identifying a set of non-relevant segments using the first combined path.

8. The method of claim 2, comprising:
    identifying a set of one or more path segments that correlate to a set of one or more characteristic paths that define the first combined path; and
    calculating a final segmentation, wherein the final segmentation is the union of the set of path segments and the set of connecting segments.

9. The method of claim 8, comprising computing a final characteristic path using the final segmentation.

10. The method of claim 8, comprising using the final segmentation to determine a group of zero or more unseen regions of the final segmentation.

11. A computer-assisted method of using volumetric image data to construct a representation of a virtual organ, the method comprising:
    determining, using one or more computer, a set of one or more candidate segments in the volumetric image data;
    identifying, using the one or more computer, a set of one or more landmark segments from the set of candidate segments;
    computing, using the one or more computer, a characteristic path for each segment in the set of candidate segments; and
    creating, using the one or more computer, a first combined path by connecting the characteristic paths, wherein the connecting is performed using a cost network;
    determining if the first combined path is well-formed;
    if the first combined path is not well-formed, then:
        identifying a descending colon segment;
        recalculating the first combined path to include the descending colon segment;
        reorienting each characteristic path in the first combined path to be consistent with a flythrough direction; and
        using the first combined path to compute a set of one or more connecting segments between one or more successive pairings along the first combined path.

12. The method of claim 11, wherein the identifying the descending colon segment includes using one or more specified anatomical characteristics.

13. The method of claim 11, comprising traversing a fragmented virtual three-dimensional object using the first combined path.

14. The method of claim 11, comprising:
    identifying a set of one or more path segments that correlate to a set of one or more characteristic paths that define the first combined path; and
    calculating a final segmentation, wherein the final segmentation is the union of the set of path segments and the set of connecting segments.

15. The method of claim 14, comprising using the final segmentation to compute a final characteristic path.

16. The method of claim 15, wherein the computing the final characteristic path comprises:
generating a triangular surface mesh;
choosing a reference triangle from a set of all triangles in the triangular surface mesh;
generating a relative distance value of every triangle in the set of all triangles in the triangular surface mesh in relation to the reference triangle;
grouping triangles to form rings that approximate cross-sectional circumferences of the final segmentation along a longitudinal axis of the segmentation;
calculating centroids of the rings; and
connecting the centroids of the rings to form the final characteristic path.

17. The method of claim 16, comprising:
pruning the final characteristic path to remove branches shorter than a threshold length; and
smoothing the final characteristic path.

18. A computer-assisted method of using volumetric image data to construct a representation of a virtual organ, the method comprising:
determining, using one or more computer, a set of one or more candidate segments in the volumetric image data;
identifying, using the one or more computer, a set of one or more landmark segments from the set of candidate segments;
computing, using the one or more computer, a characteristic path for each segment in the set of candidate segments; and
creating, using the one or more computer, a first combined path by connecting the characteristic paths, wherein the connecting is performed using a cost network;
wherein the determining the set of one or more candidate segments comprises:
identifying a set of one or more low-contrast regions in the volumetric image data;
identifying a set of one or more relevant low-contrast regions from the set of low-contrast areas;
identifying a set of one or more high-contrast regions in the volumetric image data;
identifying a set of one or more relevant high-contrast regions from the set of high-contrast areas; and
computing the set of one or more candidate segments by forming a union of the set of relevant low-contrast regions with the set of relevant high-contrast regions.

19. The method of claim 18, wherein a relevant high-contrast region is tagged stool.

20. The method of claim 18, wherein identifying a set of one or more relevant high-contrast regions comprises:
computing one or more surface meshes for each high-contrast region;
selecting one or more groups of triangles that form planes which are parallel to the coronal plane;
selecting one or more voxels associated with the one or more groups of triangles; and
using the one or more voxels to grow regions that represent tagged-stool regions.

21. The method of claim 18, wherein the identifying the set of one or more landmark segments comprises using one or more anatomical characteristics to identify each landmark segment.

22. A computer-assisted method of using volumetric image data to construct a representation of a virtual organ, the method comprising:
determining, using one or more computer, a set of one or more candidate segments in the volumetric image data;
identifying, using the one or more computer, a set of one or more landmark segments from the set of candidate segments;
computing, using the one or more computer, a characteristic path for each segment in the set of candidate segments; and
creating, using the one or more computer, a first combined path by connecting the characteristic paths, wherein the connecting is performed using a cost network;
wherein the computing a characteristic path for each segment comprises:
generating a triangular surface mesh;
choosing a reference triangle from a set of all triangles in the triangular surface mesh;
generating a relative distance value of every triangle in the set of all triangles in the triangular surface mesh in relation to the reference triangle;
grouping triangles to form rings that approximate cross-sectional circumferences of the segment along a longitudinal axis of the segment;
calculating centroids of the rings; and
connecting the centroids of the rings to form the characteristic path.

23. The method of claim 22, comprising:
pruning the characteristic path to remove branches shorter than a threshold length; and
smoothing the characteristic path.

24. The method of claim 22, wherein the determining, the identifying, the computing, and the creating are performed automatically without user intervention.

25. A computer-assisted method of using volumetric image data to construct a representation of a virtual organ, the method comprising:
determining, using one or more computer, a set of one or more candidate segments in the volumetric image data;
identifying, using the one or more computer, a set of one or more landmark segments from the set of candidate segments;
computing, using the one or more computer, a characteristic path for each segment in the set of candidate segments; and
creating, using the one or more computer, a first combined path by connecting the characteristic paths, wherein the connecting is performed using a cost network;
wherein creating a first combined path comprises:
selecting a start and end point;
constructing the cost network, wherein the cost network includes a source node that represents the start point, zero or more internal nodes representing possible connecting points, a destination node representing the end point, and one or more edges that connect pairs of nodes where each edge is associated with a cost; and
searching the cost network to find a path with a minimum cost.

26. The method of claim 25, wherein the searching includes using a branch-and-bound technique.

27. The method of claim 25, wherein the searching includes using a depth-first search.

28. A computer-readable medium including instructions that, when performed by a computer, uses volumetric image data to construct a representation of a virtual colon by:
determining a set of one or more candidate segments in the volumetric image data;
identifying a set of one or more landmark segments from the set of candidate segments;

computing a characteristic path for each segment in the set of candidate segments; and creating a first combined path by connecting the characteristic paths, wherein the connecting is performed using a cost network;

determining if the first combined path is well-formed; and if the path is not well-formed, then:

identifying a descending colon segment;

recalculating the first combined path to include the descending colon segment;

reorienting each characteristic path in the first combined path to be consistent with a flythrough direction; and using the first combined path to compute a set of one or more connecting segments between one or more successive pairings along the first combined path.

29. The computer-readable medium of claim 28, wherein the identifying the descending colon segment includes instructions for using one or more specified anatomical characteristics.

30. The computer-readable medium of claim 28, comprising instructions for:

identifying a set of one or more path segments that correlate to a set of one or more characteristic paths that define the first combined path; and calculating a final segmentation, wherein the final segmentation is the union of the set of path segments and the set of connecting segments.

31. The computer-readable medium of claim 30, comprising instructions for computing a final characteristic path using the final segmentation.

32. A computer-readable medium including instructions that, when performed by a computer, uses volumetric image data to construct a representation of a virtual colon by:

determining a set of one or more candidate segments in the volumetric image data;

identifying a set of one or more landmark segments from the set of candidate segments;

computing a characteristic path for each segment in the set of candidate segments; and creating a first combined path by connecting the characteristic paths, wherein the connecting is performed using a cost network;

wherein the computing a characteristic path for each segment comprises instructions for:

generating a triangular surface mesh;

choosing a reference triangle from a set of all triangles in the triangular surface mesh;

generating a relative distance value of every triangle in the set of all triangles in the triangular surface mesh in relation to the reference triangle;

grouping triangles to form rings that approximate cross-sectional circumferences of the structure along a longitudinal axis of the structure;

calculating centroids of the rings; and connecting the centroids of the rings to form the characteristic path.

33. A computer-readable medium including instructions that, when performed by a computer, uses volumetric image data to construct a representation of a virtual colon by:

determining a set of one or more candidate segments in the volumetric image data;

identifying a set of one or more landmark segments from the set of candidate segments;

computing a characteristic path for each segment in the set of candidate segments; and creating a first combined path by connecting the characteristic paths, wherein the connecting is performed using a cost network, wherein creating a first combined path comprises instructions for:

determining a start and end point;

constructing the cost network, wherein the cost network includes a source node that represents the start point, zero or more internal nodes representing possible connecting points, a destination node representing the end point, and one or more edges that connect pairs of nodes where each edge is associated with a cost; and searching the cost network to find a path with a minimum cost.

34. A system for using volumetric image data to construct a representation of a virtual colon, the system comprising:

a processor, operable to perform a calculation to combine two or more characteristic paths, wherein each path represents a colon segment, and wherein the calculation uses a cost network, the cost network including a source node that represents a start point, zero or more internal nodes representing possible connecting points, a destination node representing an end point, and one or more edges that connect pairs of nodes where each edge is associated with a cost;

a memory, coupled to the processor, the memory operable for storing data; and a user-interface that permits a user to store and retrieve information from the memory using the processor, wherein the processor computes the characteristic paths for each colon segment by:

generating a triangular surface mesh;

choosing a reference triangle from a set of all triangles in the triangular surface mesh;

generating a relative distance value of every triangle in the set of all triangles in the triangular surface mesh in relation to the reference triangle;

grouping triangles to form rings that approximate cross-sectional circumferences of the colon segment along a longitudinal axis of the structure;

calculating centroids of the rings; and connecting the centroids of the rings to form the characteristic path.

35. The system of claim 34, wherein the processor uses the memory to provide a complete representation of a virtual colon to the user-interface.

36. A system for using volumetric image data to construct a representation of a virtual colon, comprising:

a processor coupled to a memory;

a user-interface coupled to the processor;

an air mask extraction module to run on the processor to identify a set of one or more relevant low-contrast segments in a volumetric image data and store in the memory;

a tagged stool extraction module to run on the processor to identify a set of one or more relevant high-contrast segments in the volumetric image data and store in the memory;

a landmark identification module to run on the processor to determine one or more landmark segments in the union of the set of relevant low-contrast segments and the set of relevant high-contrast segments received from memory;

a characteristic path generation module to run on the processor to calculate a characteristic path for each segment in the union of the set of relevant low-contrast segments and the set of relevant high-contrast segments received from memory;

a path connection module to run on the processor to connect two or more characteristic paths to form a first combined characteristic path and store in the memory;

a path merger module to run on the processor to calculate one or more connecting segments that bridge segments represented by the first combined characteristic path and store in the memory;

a post-processing module to run on the processor to use the connecting segments and the segments represented by the first combined characteristic path to form a final combined characteristic path and store in the memory.

37. The system of claim 36, wherein the characteristic path generation module calculates each characteristic path by:

generating a triangular surface mesh;

choosing a reference triangle from a set of all triangles in the triangular surface mesh;

generating a relative distance value of every triangle in the set of all triangles in the triangular surface mesh in relation to the reference triangle;

grouping triangles to form rings that approximate cross-sectional circumferences of the colon segment along a longitudinal axis of the structure;

calculating centroids of the rings; and connecting the centroids of the rings to form the characteristic path.

38. The system of claim 36, wherein the path connection module connects characteristic paths using a cost network and a minimization process, wherein the cost network includes a source node that represents a start point, zero or more internal nodes representing possible connecting points, a destination node representing an end point, and one or more edges that connect pairs of nodes where each edge is associated with a cost, and wherein the minimization process includes a branch-and-bound technique.

39. The system of claim 36, wherein the processor uses the memory to provide a representation of a virtual colon to the user-interface.

* * * * *

UNITED STATES PATENT AND TRADEMARK OFFICE
CERTIFICATE OF CORRECTION

PATENT NO. : 7,574,029 B2 Page 1 of 1
APPLICATION NO. : 11/287497
DATED : August 11, 2009
INVENTOR(S) : Peterson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Seventh Day of September, 2010

David J. Kappos
*Director of the United States Patent and Trademark Office*